Dec. 23, 1941.   C. E. JOHNSON   2,267,566
VARIABLE-SPEED POWER DEVICE
Filed May 1, 1933   7 Sheets-Sheet 1
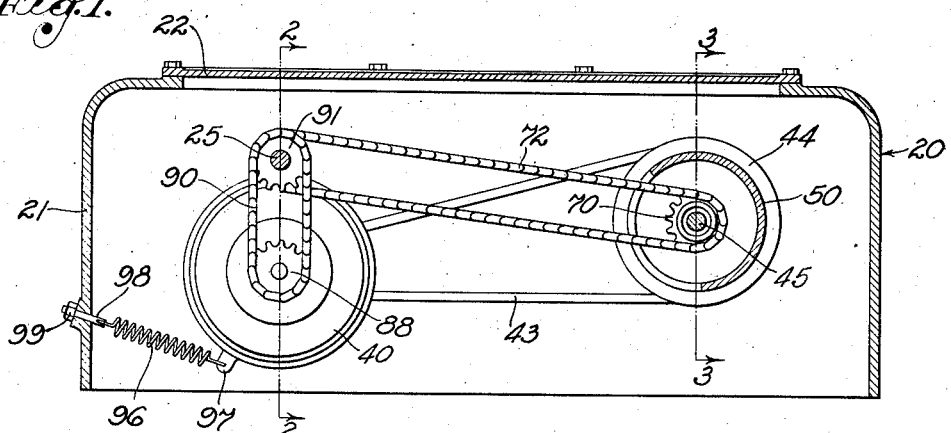
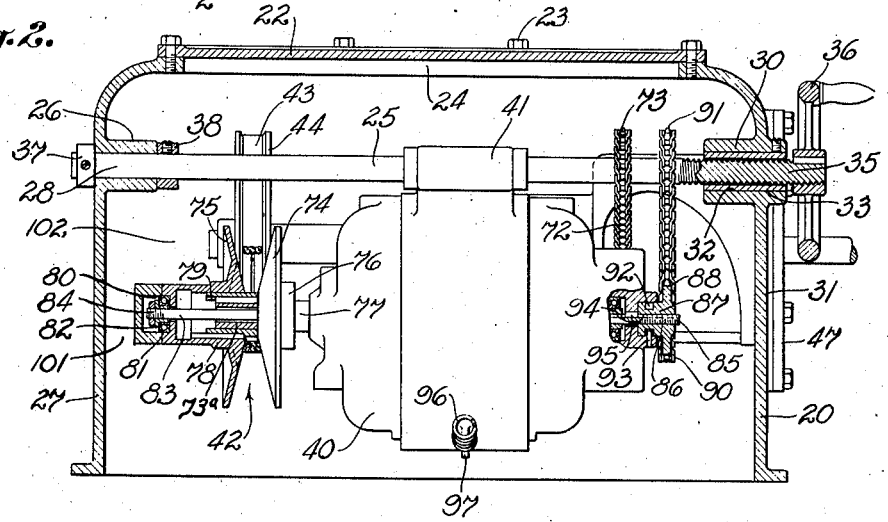
INVENTOR:
Carl E. Johnson,
BY
ATTORNEY.

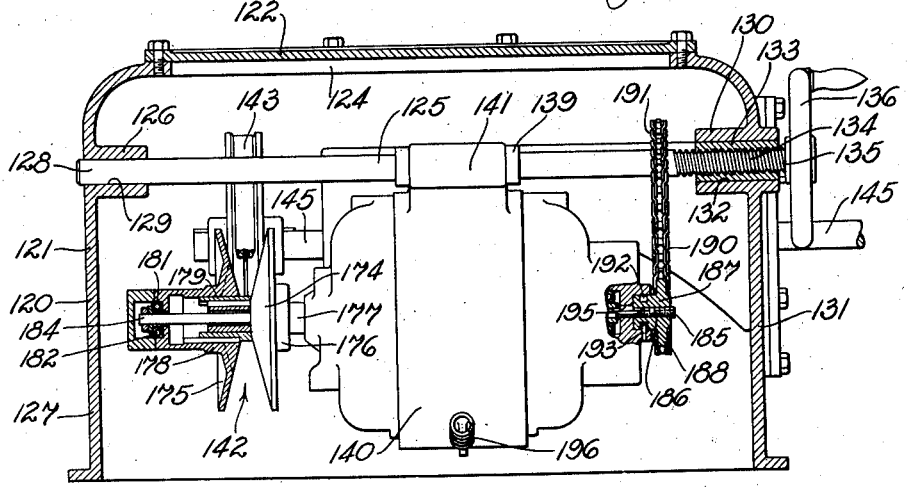
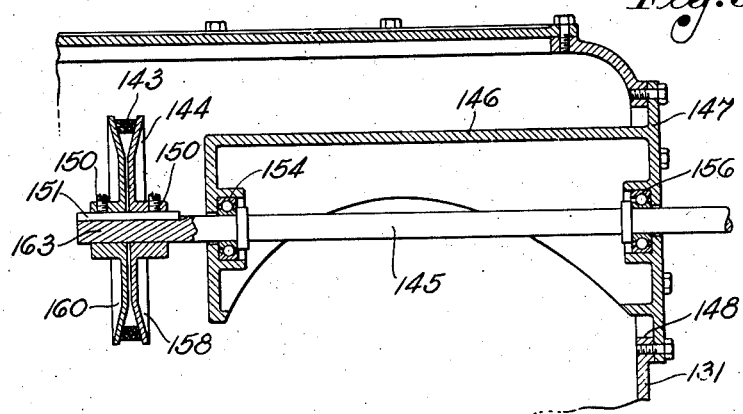
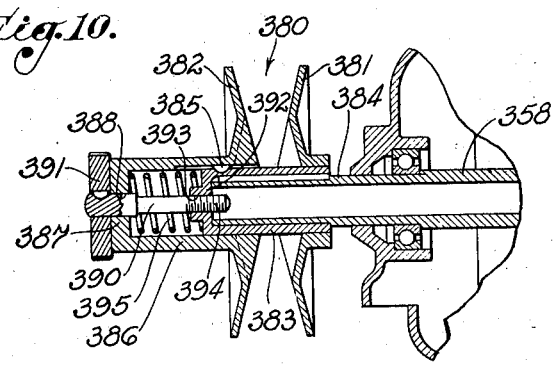

Dec. 23, 1941.　　　C. E. JOHNSON　　　2,267,566
VARIABLE-SPEED POWER DEVICE
Filed May 1, 1933　　　7 Sheets-Sheet 3

INVENTOR:
Carl E. Johnson,
By
ATTORNEY.

Dec. 23, 1941.  C. E. JOHNSON  2,267,566
VARIABLE-SPEED POWER DEVICE
Filed May 1, 1933  7 Sheets-Sheet 4
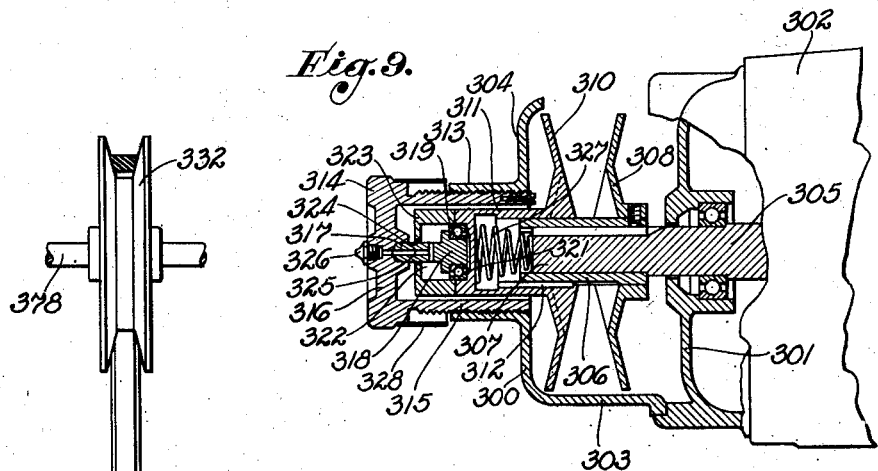
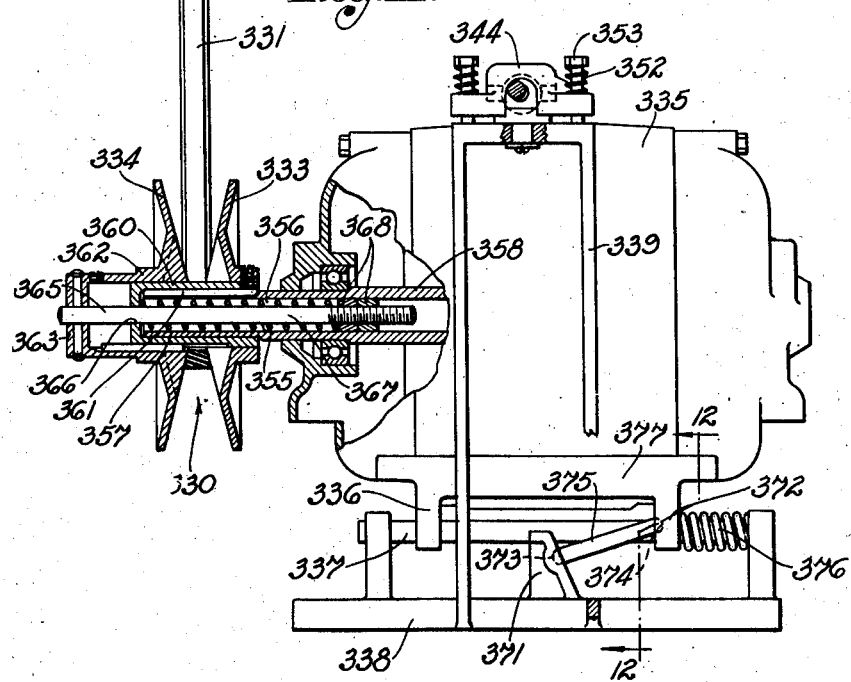
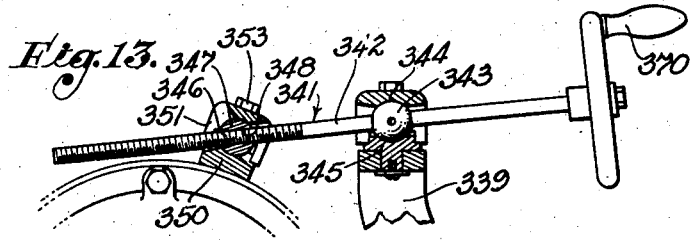
INVENTOR:
Carl E. Johnson,
By
ATTORNEY.

Dec. 23, 1941. C. E. JOHNSON 2,267,566
VARIABLE-SPEED POWER DEVICE
Filed May 1, 1933 7 Sheets-Sheet 5
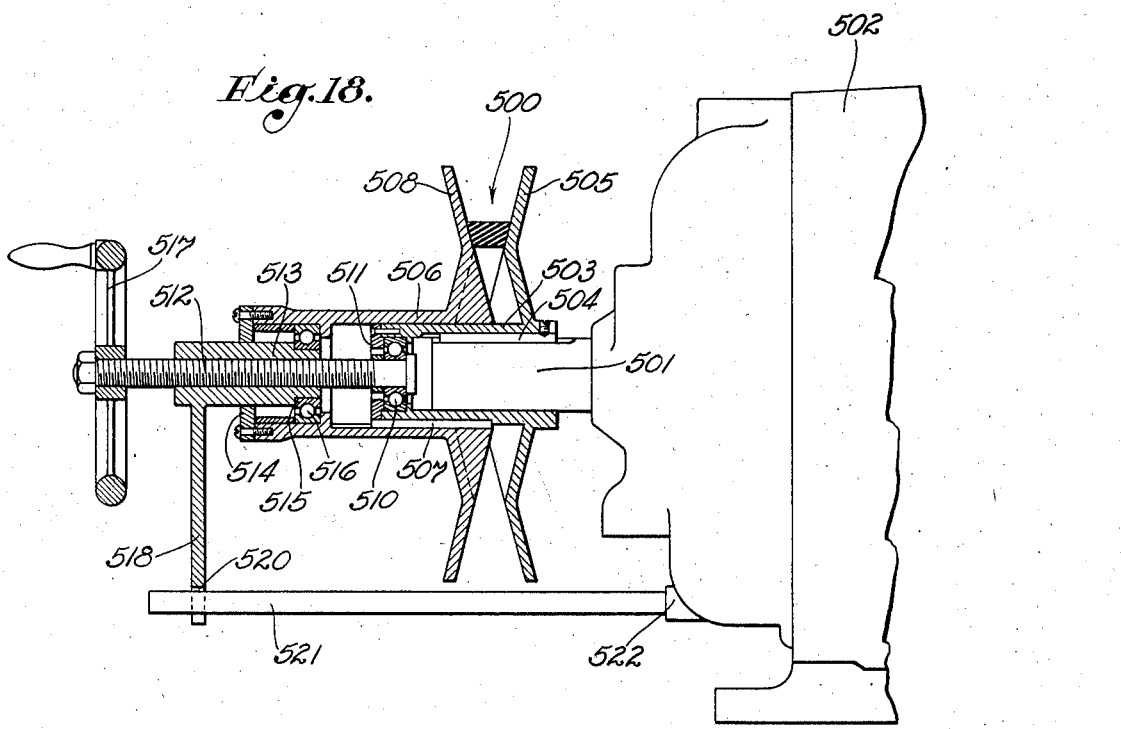
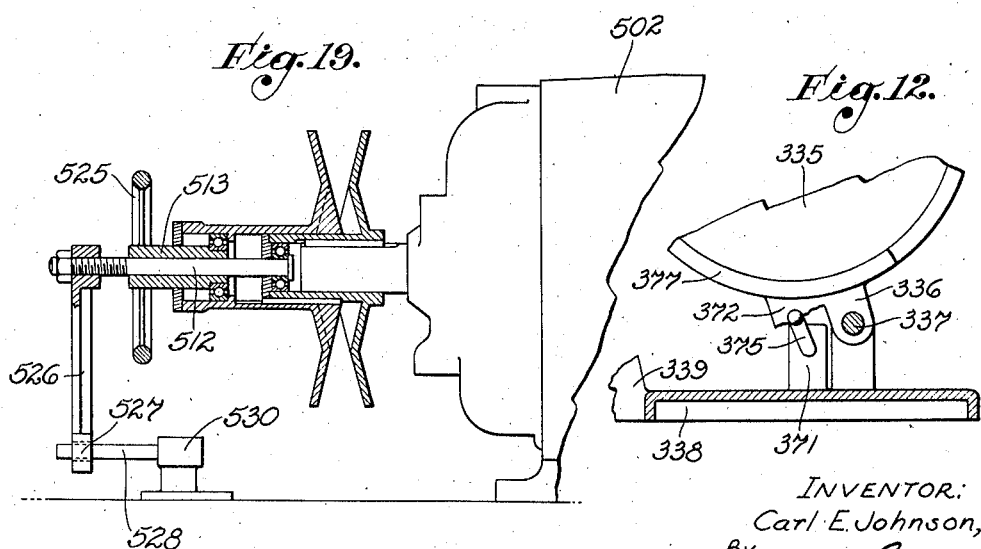
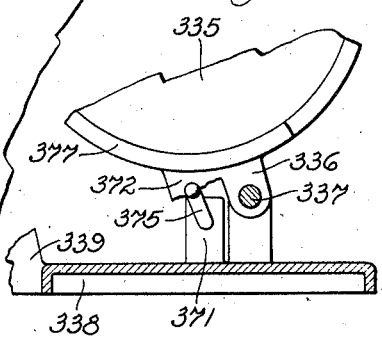
INVENTOR:
Carl E. Johnson,
BY
ATTORNEY Dec. 23, 1941.   C. E. JOHNSON   2,267,566
VARIABLE-SPEED POWER DEVICE
Filed May 1, 1933   7 Sheets-Sheet 6

INVENTOR:
Carl E. Johnson,
By
ATTORNEY.

Dec. 23, 1941.  C. E. JOHNSON  2,267,566
VARIABLE-SPEED POWER DEVICE
Filed May 1, 1933   7 Sheets—Sheet 7
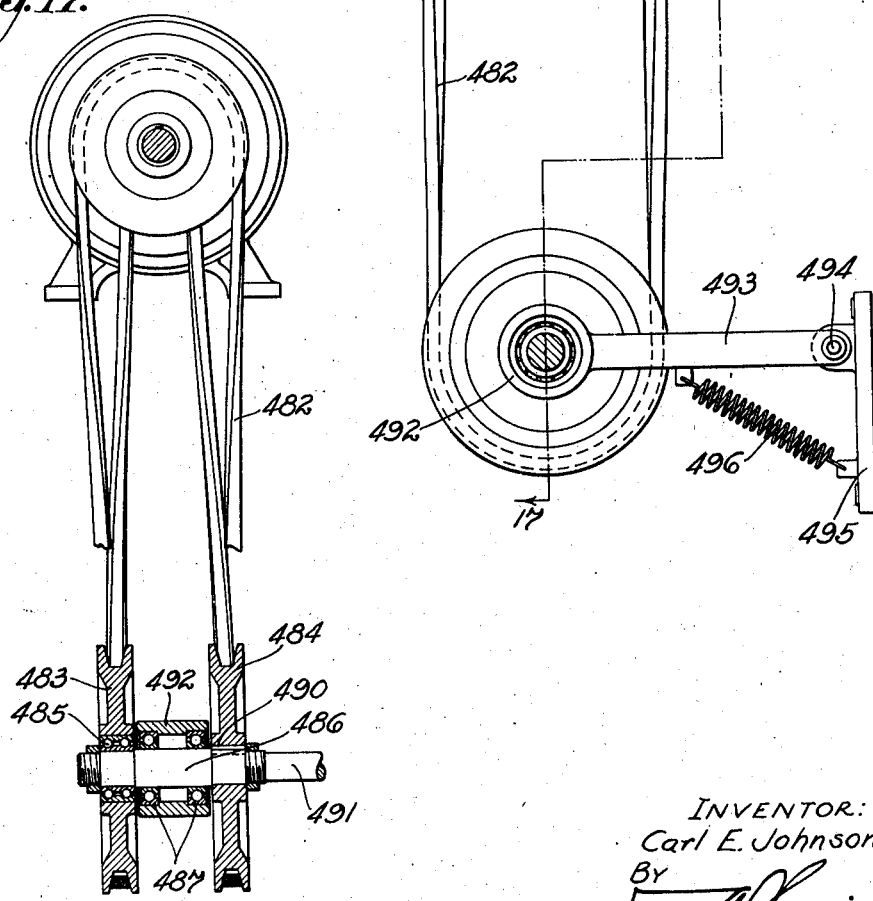
INVENTOR:
Carl E. Johnson,
By
ATTORNEY.

Patented Dec. 23, 1941

2,267,566

UNITED STATES PATENT OFFICE 2,267,566

VARIABLE-SPEED POWER DEVICE

Carl E. Johnson, Pasadena, Calif., assignor to Sterling Electric Motors, Inc., Los Angeles, Calif., a corporation of California Application May 1, 1933, Serial No. 668,772

19 Claims. (Cl. 74—230.17)

My invention relates in general to power devices adapted to drive machinery at variable speeds, and relates particularly to power devices having variable-diameter belt and pulley transmission means.

The objects of my present invention are in general to provide in variable-speed power devices having one or more variable-diameter pulleys simple means whereby the variable-diameter pulley or pulleys may be quickly and positively adjusted to produce a desired speed of a power output or power delivery shaft which is adapted to be connected to a power utilizing device in accordance with the known practices of coupling, gearing, or belting; to provide a simple and effective arrangement of cooperating elements necessary to produce a variable-speed power device in which the pulleys will be at all times properly aligned, thereby minimizing belt wear; to provide in devices of the foregoing character means for automatically aligning the adjustable-diameter pulleys in accordance with the adjustment of the variable-diameter pulleys in changing the effective diameters thereof; and to produce certain important improvements in the construction of variable-speed power devices as hereinafter set forth.

The present invention may be embodied in a unitary power device having a power or motivating element such as a motor and a driven member as represented by a shaft. On the motor and on the shaft cooperating V-belt pulley members are placed, the effective diameters of which are varied by relative axial movement of their flanges. In this form of the invention interconnected screw means are provided at each of the variable-diameter pulleys for simultaneously adjusting the pulleys so as to produce a decrease in the diameter of one pulley as the effective diameter of the other pulley is increased, there being means for maintaining the belt in the necessary tight operating engagement with the pulleys.

A feature of the device described in the foregoing paragraph is that the operating parts thereof may be readily concealed within a housing but may be at all times readily accessible for the purpose of replacing the V-belt when necessary.

A further object of the invention is to provide in variable-speed power devices of this general character a pair of cooperating V-type pulleys placed respectively on the power element and on the driven shaft member, one of which pulleys is of variable diameter and comprises a flange which is fixed relative to its support and a cooperating flange which is movable relative thereto, together with means for manually or mechanically positively moving the movable flange relative to the fixed flange, and means automatically operating in consequence of the adjustment of the variable-diameter pulley for producing a relative axial bodily movement of the variable pulley and the non-variable pulley whereby to maintain alignment of the center lines or belt lines of the pulleys at all positions of adjustment of the variable-diameter pulley, and also means for maintaining the belt in tight operative engagement with both of the pulleys during all positions of adjustment of the variable-diameter pulley.

A further object of the invention is to provide a power device of the general character set forth in the preceding paragraph, which employs a spring-adjusted V-type pulley instead of a manually or mechanically adjusted V-type pulley, and is provided with means for moving the pulleys together and apart so that the V-belt running thereover will produce a desired adjustment of the spring-operated V-type pulley, together with means for producing a relative axial movement of the pulleys during the movement of the pulleys in the plane defined by the belt, whereby to maintain operating alignment of the pulleys.

It is a further object of the invention to provide a new and improved manually or mechanically adjusted V-belt pulley structure, and to provide a V-belt pulley structure which may be mounted on a motor shaft and will require a minimum of space outside the motor structure.

A further object of the invention is to provide a novel and valuable spring-adjusted variable-diameter V-type pulley having minimum space requirements.

It is a further object of the invention to provide an adjustable V-type pulley structure of the character hereinabove set forth having means showing the adjustment thereof, which means may have a scale of arbitrary character showing the effective diameter of the pulley, or showing the speed at which some member is driven by the adjustable pulley.

Further objects and advantages of the invention will be made evident throughout the following part of the specification.

Referring to the drawings, which are for illustrative purposes only,

Fig. 1 is a longitudinally vertically sectioned view showing a form of my invention having a pair of cooperating variable-diameter pulleys.

Fig. 2 is an enlarged cross section on a plane represented by the line 2—2 of Fig. 1.

Fig. 3 is an enlarged fragmentary section taken as indicated by the line 3—3 of Fig. 1.

Fig. 4 is a view similar to Fig. 2 showing a form of my invention employing one variable-diameter pulley and one non-variable-diameter pulley.

Fig. 5 is a fragmentary sectional view showing the manner in which the driven shaft of Fig. 4 is mounted in the housing.

Fig. 9 is a vertically sectioned view showing a form of my manually adjustable variable-diameter pulley mechanism applied to an electric motor.

Fig. 10 is a fragmentary sectional view showing a form of my mechanically adjusted variable-diameter pulley of simple form adapted to be adjusted when the pulley is stopped.

Fig. 11 is a partly sectioned view showing a form of my invention employing a spring-operated variable-diameter pulley and my improved means for maintaining alignment of the variable-diameter pulley and the V-pulley cooperating therewith.

Fig. 12 is a fragmentary view taken as indicated by the line 12—12 of Fig. 11.

Fig. 13 is a fragmentary, partly sectioned detail cooperating with Fig. 11 to show the manner in which the motor is swung on its support.

Fig. 16 is a partly sectioned elevational view showing a form of my invention in which the driving and driven pulleys are axially aligned and are connected by a V-belt extending over idler pulleys.

Fig. 17 is a sectional view taken as indicated by the line 17—17 of Fig. 16.

Fig. 18 is a view showing a form of my mechanically or manually operated pulley adapted to be readily mounted on the end of any shaft.

Fig. 19 is a view similar to Fig. 18, showing a variation of the form of the invention of Fig. 18.

Figure 6:
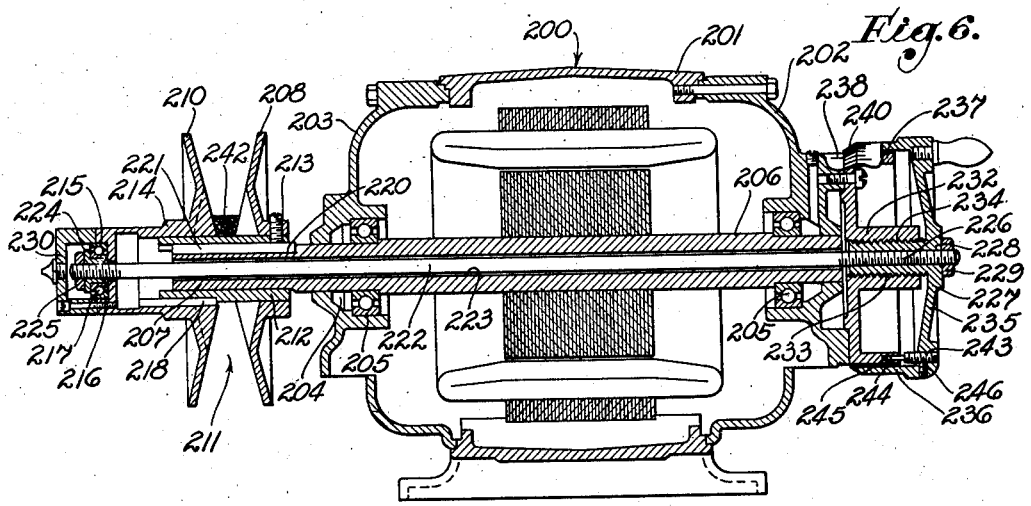
Fig. 6 is a vertically sectioned view showing a form of my manually adjustable variable-diameter pulley mechanism applied to an electric motor.

In the form of the invention shown in Figs. 1, 2, and 3, I provide a supporting structure for the operating elements of the variable-speed power device, this supporting structure being in the form of a housing 20 which may be open on the bottom, since in the general use thereof the power device is to rest upon a floor surface. This housing 20 has a rectangular peripheral wall 21 across which a top wall 22 extends, such top wall being removably secured by screws 23 in a position to ordinarily close an opening 24 in the top of the housing 20 defined by the side wall structure 21. Within the housing 20 and near one end thereof, such as the leftward end, a bar 25 is extended in laterally directed position, there being a bored boss 26 in the leftward side wall 27 of the housing 20, as shown in Fig. 2, to receive the leftward end 28 of the bar 25, and there being a boss 30 in the rightward wall 31 of the housing 20 having an opening 32 carrying a bushing 33 which in the present form of the invention has a smooth bore so that it does not have threaded engagement with the rightward end 35 of the bar 25. The bar 25 may be rotated by means of a handle 36 placed on the exterior of the housing 20, but the bar 25 is prevented from axial movement by collars 37 and 38 which are fixed on the leftward end 28 of the bar 25 adjacent the ends of the boss 26.

A power device in the form of a motor 40 is provided with an upwardly extending projection or bracket 41 which is secured to the intermediate portion of the bar 25, so that the bar 25 carries the motor in suspended position and in such a manner that the motor may swing rightwardly or leftwardly for a purpose which will be hereinafter described.

The motor 40 carries a V-type variable-diameter pulley 42 which is operatively connected by means of a V-type belt 43 with an adjustable or variable-diameter V-type pulley 44 mounted on a shaft 45 which extends parallel to the bar 25 and the axis of rotation of the motor 40, but is disposed near the rightward end of the housing 20 as shown in Fig. 1. The shaft 45 is carried in a supporting bracket 46 having a circular plate portion 47 adapted to fit over an opening 48 formed in the rightward side wall portion 31 of the housing 20 on the plane defined by the line 3—3 of Fig. 1. This circular plate portion 47 has extending inwardly or leftwardly therefrom, as shown in Fig. 3, an arced wall 50 carrying a web 51 at its inner end, this web 51 in turn carrying an internally threaded boss or projection 52 which receives an externally threaded sleeve 53. The sleeve 53 carries a bearing 54 of the combined radial-thrust type, and for this purpose the leftward end of the sleeve 53 is provided with a counterbore 55 which receives the bearing 54. The rightward portion of the shaft 45 is carried in a bearing 56 supported by the plate portion 47 of the supporting bracket 46, but the leftward portion of the shaft 45 is carried by a sleeve 57 formed in conjunction with the movable flange 58 of the pulley 44, which movable flange cooperates with a fixed flange 60 secured directly to the shaft 45 by means of a threaded pin 61 which extends through the hub 62 of the flange 60 and through an opening 63 in the leftward end of the shaft 45. The bearing 56 engages the shaft 45 in such a manner that it cannot move in leftward direction from the position in which it is shown in Fig. 3. This may be accomplished by disposing the inner race 64 of the bearing 56 between collars 65 and 66 which are locked on the shaft 45. The outer race 67 of the bearing 56 is immovably held in a bearing case 68 formed in the plate portion 47 in accordance with the well known practice of bearing use.

The sleeve 57, Fig. 3, is splined to the leftward portion of the shaft 45 and is permitted to move axially thereupon. Accordingly, as the sleeve 53 is rotated in the threaded boss 52, the bearing 54 will be moved, and since this bearing is mounted upon the rightward end 69 of the sleeve 57 as shown in Fig. 3, axial movement of the sleeve 53 will produce an axial movement of the sleeve 57 and the flange 58 relative to the shaft 45. Therefore, by rotating the sleeve member 53 in a desired direction, the flange 58 may be moved toward or away from the fixed flange 60 so as to increase or decrease the effective diameter of the pulley 44, it being noted that the flanges 58 and 60, in accordance with standard practice of V-belt pulley construction, are of conical form so that they flare outwardly. As the V-shaped space between the flanges 58 and 60 is increased in width from the size thereof shown in Fig. 3, the belt 43 moves inwardly toward the center or axis of the pulley, and accordingly the belt operates upon a smaller effective diameter of the pulley, this resulting in a higher speed of rotation of the pulley where the speed of the belt remains constant.

For the purpose of mechanically adjusting the variable-diameter pulley 44, I provide a sprocket 70 on the leftward end 71 of the sleeve 53, and from this sprocket 70 I extend a chain 72 to a sprocket 73 mounted on the bar 25. Accordingly, rotation of the bar 25 by means of the handle 36 accomplishes the desired rotation of the sleeve 53 and a corresponding movement of the flange 58 relative to the fixed flange 60.

A valuable feature of the invention relates to the simple and efficient manner in which adjustment of the drive pulley 42 is accomplished. As shown in Fig. 2, the motor is provided with a hollow shaft 73a which is mounted in the customary manner in bearings, not shown. The pulley 42 consists of a fixed flange 74 and an axially movable flange 75, the fixed flange 74 being equipped with a hub 76 which is mounted directly upon the leftward end 77 of the shaft 73a adjacent the leftward end of the motor 40. The axially movable flange 75 is keyed or splined upon the leftward extremity of the hollow shaft 73a, as shown at 79, and the hub 78 of the movable flange 75 preferably projects leftwardly beyond the end of the shaft 73a and is counterbored at 80 to receive the outer face 81 of a combined radial-thrust ball bearing 82 which is mounted upon the leftward end 83 of a rod or bar 84 which extends through the shaft 73a from end to end thereof, as shown. The rightward end 85 of the rod 84 projects from the rightward end of the hollow shaft 73a and is provided with external threads 86, on which a nut member 87 is mounted, this nut member having a sprocket 88 formed at the outer end thereof to receive a chain 90 which runs over a sprocket 91 fixed upon the bar 25. The nut member 87 has a peripheral groove 92 engaged by a pin 93 carried by the motor structure, so that the nut 87 may rotate but cannot move in axial direction. The rod 84 has an axial keyway 94 therein adapted to be engaged by a key 95 carried by the motor structure to prevent rotation of the rod 84 but to permit axial movement thereof as controlled by the nut member 87. Accordingly, by rotation of the nut member 87, the rod 84 may be moved axially so as to accomplish a corresponding movement of the bearing 82 and a corresponding movement of the axially movable flange 75, such movement of the flange 75 accomplishing a variation in the effective diameter of the adjustable V-belt pulley 42 of which it forms a part.

The threads on the exterior of the sleeve 53, Fig. 3, are so formed relative to the threads 86 of the rod 84, Fig. 2, that when the bar 25 is rotated, the flanges 58 and 75 will move in the same direction and through equal distances. Accordingly, when the flange 75 is moved from the position in which it is shown in Fig. 2 toward the flange 74, the flange 58 of Fig. 3 will move from its position away from the flange 60; therefore, as the effective diameter of the pulley 42 is increased, the effective diameter of the pulley 44 will be proportionately decreased, thereby producing an increase in the driving ratio effected between the pulleys 42 and 44.

The bar 25 through which the variation in the speed of rotation of the shaft 45, which may be referred to as the power delivery or power output shaft, is accomplished also supports the motor 40 in operative position and so that such motor 40 may have a swinging movement for the purpose of varying the distance between the pulleys 42 and 44 as may be required by change in the belt length or other conditions. For the purpose of maintaining the belt 43 substantially tight upon the pulleys 42 and 44, I prefer to provide a resilient means in the form of a spring 96, connected to a lug 97 formed on the lower part of the motor 40 and to a bar 98 which extends through the wall 21 and has an adjustment nut 99 threaded on the exterior end thereof for the purpose of varying the tension of the spring 96. Viewing the variable-speed power device as in Fig. 1, it will be perceived that the spring 96 continuously urges the motor 40 in leftward direction and accordingly exerts a proportionate tension in the belt 43 to hold such belt with proper tightness upon the pulleys 42 and 44. The pulley 42 is supported in outboard relation to the motor 40, or, in other words, with the leftward end of the pulley entirely in the opening so that a loop belt may be readily placed over the pulley 42, and also the leftward end 63 of the shaft 45 and the pulley 44 are in outboard relation to the bearing 54 so that the leftward end of the pulley 44 is uncovered, thereby leaving spaces 101 and 102 between the leftward ends of the respective pulleys 42 and 44 and the side wall 27 of the housing 20 through which a loop belt may be passed in placing the same upon the pulleys 42 and 44 without the necessity of dismantling any of the parts of the variable-speed power device other than the removal of the cover plate 22 so as to provide access to the interior of the housing 20 through the opening 24 in the top thereof. In this simple construction of the power device the operating parts are entirely concealed and are protected from dust. The control means represented by the extending end 35 of the bar 25 and the handle 36 are both exposed in exterior relation to the housing 20, and the rightward end 104 of the power delivery shaft 45 projects from the housing 20 for connection to a machine to be driven.

In Figs. 1 to 3 I have shown a form of my invention in which a speed change ratio of six to one is made possible by use of two variable-diameter pulleys 42 and 44, the effective diameters of which change in opposite manners so that when one of the pulleys is adjusted to produce a maximum effective diameter thereof, the other of the pulleys will be adjusted to produce a minimum diameter thereof. In Figs. 4 and 5 I show a form of my invention in which only one variable-diameter V-type pulley is employed, the other V-type pulley being of fixed diameter during the operation of the device. This form of the invention is a variation from the first form of the invention shown in Figs. 1 to 3 and has a feature of being able to employ most of the cooperating parts shown in Figs. 1 to 3, as will be perceived from the similarity of the illustrations.

As shown in Figs. 4 and 5, the second form of the invention employs a housing 120 which is the duplicate of the housing 20 and has a peripheral vertical wall 121 to the upper edges of which a cover 122 is secured in a position to close an opening 124. Across the end of the housing 120 a horizontal bar 125 is directed, this bar being supported in a boss 126 in the side wall portion 127 of the housing 120. The leftward end 128 of the bar 125 is slidable and rotatable in an opening 129 formed by the boss 126. The rightward end of the bar 125 extends through a boss 130 formed in the upper part of the side wall portion 131 of the housing 120, this boss having a bore 132 in which a threaded bushing 133 is inserted in a position to engage threads 134. It will be perceived that the second form of the invention does not employ the collars 37 and 38 of Fig. 2 and employs a threaded sleeve 133 instead of the smooth bore sleeve 33 of Fig. 2. When the handle 136 on the projecting end 135 of the bar 125 is rotated, the threaded engagement of the bar 125 with the sleeve 133 will cause the bar 125 to move axially.

A motor 140 is suspended from an intermediate portion of the bar 125 by means of a bracket member 141 confined between collars 139 which are secured upon the bar 125. The motor 140 has a mechanically adjusted variable-diameter pulley 142 which receives a belt 143 which runs over a fixed pulley 144 mounted on a power delivery shaft 145 which is supported in bearings 154 and 156 supported in a bracket member 146 having an end plate 147 at the rightward end thereof adapted to be secured over an opening 148 in the side wall 131 of the housing 120. The shaft 145 is held against axial movement with the result that the pulley 144 has a fixed position of operation. This pulley consists of a pair of cooperating conical flanges 158 and 160 adapted to be secured upon the outboard end 163 of the shaft 145 by means of screws 150, and the flanges 158 and 160 are prevented from rotating relative to the shaft 145 by a suitable key 151. The cooperating flanges 158 and 160 are shown in close relation in Fig. 5 so that the belt 143 engages the peripheral portions thereof. These flanges 158 and 160 may be spread apart so that a V-type pulley of smaller effective diameter is produced. It will be perceived, however, that no means are provided for varying the effective diameter of this pulley 144 during the operation of the power device.

The pulley 142 has a fixed flange 174 and an axially movable flange 175. The fixed flange 174 is provided with a hub 176 secured immovably upon the leftward end 177 of a hollow shaft 173 with which the motor 140 is equipped. The axially movable flange 175 has a hub 178 which slidably fits upon the leftward extremity 177 of the shaft 173 and is prevented from rotation relative to the shaft 173 by a key or spline means such as shown at 179. The leftward end of the hub 178 is preferably fitted, as by counterboring, to receive the outer race 181 of a thrust-type ball bearing 182 which is secured upon the leftward end of a rod 184 which extends through the hollow shaft 173 from end to end thereof. The rightward end 185 of the bar 184 has a threaded portion 186 on which a nut member 187 is screwed, this nut member being provided with a sprocket 188 on its rightward or outer end, which sprocket 188 is connected by means of a looped chain 190 with a sprocket 191 mounted on the bar 125.

The nut member has an annular groove 192 in the periphery thereof which is engaged by a pin 193 carried by the structure of the motor 140, so that the nut member 187 may rotate but is prevented from axial movement. The rod 184 has a longitudinal keyway therein adapted to be engaged by a key 195 carried by the motor structure, this key 195 preventing rotation of the rod 184 but permitting axial movement thereof by the nut member 187. By rotating the external handle 136, the bar 125 is rotated, this rotation being transmitted through the sprocket 191, the chain 190, and the sprocket 188 to the nut 187. The rotation of the nut 187 moves the rod 184, and the movement of the rod 184 is transmitted through the thrust bearing 182 to the movable flange 175, thereby changing the adjustment of the pulley 142 by decreasing or increasing the width of the V-slots between the flanges 174 and 175.

It is a feature of this form of the invention to provide a means for bodily moving one of the V-pulleys in axial direction as the driving ratio of the pulleys is changed, for the purpose of maintaining the V-grooves of the pulleys in alignment so that the belt will not be twisted to one side or the other. It will be perceived that as the flange 175 of the adjustable pulley 142 is moved rightwardly from the position in which it is shown in Fig. 4, the width of the V-slot between the flanges 174 and 175 will decrease and the central plane or center line of the slot will move rightwardly toward the flange 174. Therefore, if the center lines of the pulleys 142 and 144 are to be kept in alignment, either the pulley 142 or the pulley 144 must be moved in an axial direction to compensate for the change in the position of the center line of the adjustable pulley as the result of the movement of the movable flange 175 thereof. I provide means for this relative axial movement between the pulleys 142 and 144 in the form of the interengaging threaded parts consisting of the threads 134 of the bar 125 and the internally threaded sleeve 133. As the bar 125 is turned by use of the handle 136 for the purpose of rotating the nut member 187 so as to adjust the variable-diameter pulley 142, the threaded portion 134 causes the bar 125 to move in axial direction, this axial movement of the bar being transmitted directly to the motor 140 so as to move the motor 140 and the pulley 142 bodily in axial direction to keep the center line of the pulley 142 in alignment with the center line of the pulley 144 as the speed ratio is changed.

In the form of the invention shown in Figs. 4 and 5 means are provided for holding the belt 143 tight at all times, such means being shown in the form of a spring 196, which is connected to the lower end of the motor 140 in such a manner as to exert a force to swing the motor 140 away from the shaft 145. In the design of this device the threads 134 and 186 are made quite coarse. It may be necessary to take into consideration the fact that the motor 140 will be caused to swing upon the bar 125 as a result of the change of the effective diameter of the pulley 142 and that such swinging movement will produce a small rotation of the sprocket 188 relative to the sprocket 191.

Figure 7:
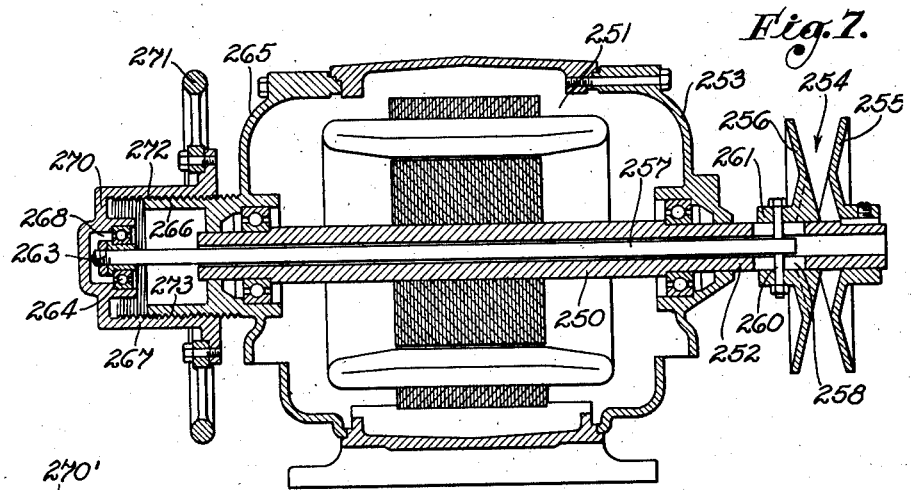
Fig. 7 is a vertically sectioned view showing a form of my manually adjustable variable-diameter pulley mechanism applied to an electric motor.
Figure 8:
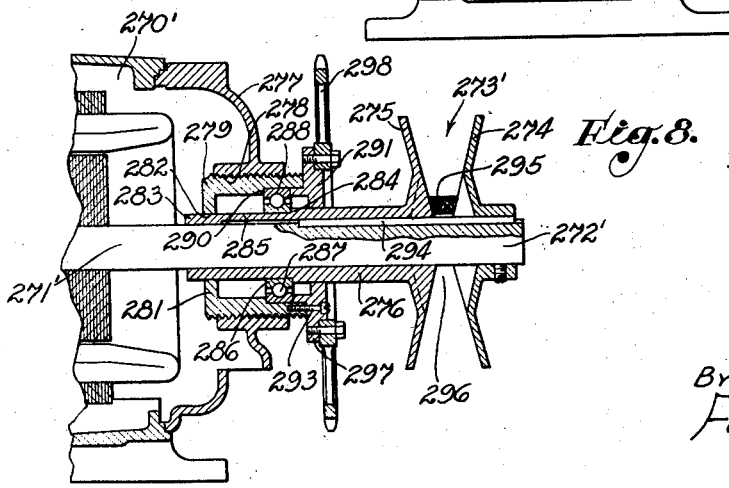
Fig. 8 is a vertically sectioned view showing a form of my manually adjustable variable-diameter pulley mechanism applied to an electric motor.

In Figs. 1 to 5 I have shown a motor equipped with a simple form of my mechanically adjustable V-belt pulley. As shown in Figs. 6, 7, and 8, my invention includes a number of different forms of mechanisms whereby a V-belt pulley may be adjusted upon a motor shaft while the motor is in operation, this structure when combined with the motor producing a self-contained variable-speed motor unit. In Fig. 6 I show a motor 200, the housing 201 of which is provided with end plates or end bells 202 and 203. Fitting into bearing recesses or bearing cases 204 formed in the end bells 202 and 203 are ball bearings 205 which support a hollow or tubular motor shaft 206. One end 207 of the hollow shaft 206 extends from the end bell 203, and upon this end 207 cooperating flange members 208 and 210 are secured as a part of a variable-diameter V-type pulley 211. The pulley 211 is made up as a unit so that it may be slipped bodily upon the end 207 of the shaft 206, and includes a sleeve 212 to which the flange 208 is fixedly secured by means such as illustrated by a screw 213. The flange 210 is axially slidable upon the sleeve 212 and has an outwardly extending hub or sleeve portion 214 equipped with an end recess or counterbore 215 to hold the outer race 216 of a roller-type or ball-thrust bearing 217. To prevent rotation of the flange 210 on the sleeve 212, spline means 218 are provided therebetween. The end 207 of the hollow shaft 206 is provided with a keyway 220 adapted to receive a key 221 for preventing rotation of the sleeve 212 and the pulley unit 211 relative to the shaft 206.

The assembled pulley unit 211, comprising the parts 208 to 213, is slipped bodily upon the end 207 of the shaft 206, and the set screw 213 is tightened to hold the same in place. The thrust bearing 217 is then placed in the bearing recess 215, and a rod 222 is extended through the bearing 217 and through the opening 223 of the shaft 206. A cover 230 is preferably placed on the end of the hub 214 to cover the bearing 217. On the leftward end of the rod 222 is a bushing 224 which is held in place by means of a nut 225 and serves to centralize the leftward end of the rod 222 within the bearing 217.

The rightward end 226 of the rod 222 projects from the shaft 206 and has an operating or actuating member 227 thereon, this actuating member having a central hub or sleeve portion 228 which is threaded upon the end 226 of the rod 222 and is locked thereon against rotation or other movement by means of a lock nut 229. The rightward end bell 202 of the motor 200 has a member 231 secured thereto, this member 231 having an outwardly extending axial sleeve 232 having internal threads 233 engaging threads 234 on the exterior of the hub 228 of the operating member 227. The actuating member 227 has an essentially radially extending wall 235 at the outer edge of which a cylindrical flange or wall 236 inwardly extends. The wall 236 overlaps a cylindrical wall 237 formed peripherally upon the member 231, the walls 236 and 237 cooperating in the provision of an indicating means for showing desired information relative to the adjustment, effective diameter, or driving relation of the pulley 211. For this purpose an arrow 238 may be placed on the member 231 or adjacent thereto, and indications 240 may be placed upon the cylindrical wall 236 of the member 227 to impart the desired information.

In Fig. 6 the pulley 211 is shown with the flanges 208 and 210 thereof separated so as to produce a minimum effective diameter on which a belt 242 will operate. By rotation of the member 227 the threads 233 and 234 will cause the rod 222 to move rightwardly, thereby carrying the thrust bearing 217 in rightward direction and moving the flange 210 toward the flange 208. It will be accordingly perceived that the flange 210 may be moved toward and away from the flange 208 as desired by rotating the member 227 so as to vary the width of the V-slots formed between the flanges 208 and 210, and thereby vary the effective diameter of the pulley 211 on which the belt 242 will operate.

For the purpose of securing the adjustable parts associated with the variable-diameter pulley structure in a desired position of adjustment, I show a lock screw 243 having an end or point 244 adapted to engage openings, such as the holes 245, in the edge face of the cylindrical wall 237. To assure the holding of the screw 243 against loosening due to vibration, I show a set screw 246 in a position to lock the screw 243 rigidly in place.

In Fig. 7 I show a form of variable-diameter adjustable pulley structure in which the inner flange of the adjustable pulley is movable relative to the outer flange instead of the outer flange being movable, as shown in Figs. 2, 5, and 6. In this form of the invention, a hollow shaft 250 is supported in a motor structure 251 in such position that the rightward end 252 thereof will project from an end bell 253 of the motor structure. On this projecting end 252 a variable-diameter V-type pulley 254 is operatively secured. Such variable-diameter pulley 254 comprises a fixed flange 255 which is immovably secured upon the extremity of the hollow shaft 250, and an axially movable flange 256 disposed between the fixed flange 255 and the end of the motor structure 251. Axial movement of the flange 256 is employed to vary the effective diameter of the pulley 254, and such axial movement is accomplished by connecting the flange 256 to the rightward end of a bar or rod 257 which extends within the hollow shaft 250. Diametrally opposed longitudinal slots 258 are formed in the wall of the hollow shaft 250 in such position that a diametrally positioned pin or bar 260 may be extended therethrough so as to engage the rightward end of the rod 257 and the hub 261 of the movable flange 256. Axial movement of the rod 257 for the purpose of moving the flange 256 is accomplished by extending the leftward end 263 of the rod 257 from the leftward end of the hollow shaft 250 and mounting thereon a bearing 264 by which the rod 257 may be moved axially while such rod 257 is rotating with the shaft 250. In the previous forms of my invention the operating rod extending through the hollow shaft of the motor has been held stationary while the motor shaft rotates, but in this form of the invention the axial rod is permitted to rotate with the motor shaft. The motor structure 251 is provided with a leftward end bell 265 having a tubular, externally threaded projection 266 upon which a hollow, internally threaded member 267 is mounted, this member having a bearing recess 268 formed within the end wall 270 thereof so as to engage the outer race of the ball bearing 264. For rotating the member 267, a hand wheel 271 is mounted thereon, preferably in a position adjacent the end of the motor structure 251, as shown.

The operation of the form of the invention shown in Fig. 7 consists in rotating the hand wheel 271 so as to cause the threads 272 of the member 267 to move upon the threads 273 of the extension 266, thereby transmitting an axial movement to the bearing 264, which movement is in turn transmitted through the axial rod 257 and the diametral connecting pin 260 to the movable flange 256. In this form of the invention the inner race of the ball bearing 264 rotates, and the outer race of such bearing 264 remains substantially stationary in the bearing recess or bearing case of the member 267.

In the form of my mechanically adjusted pulley shown in Fig. 8, I avoid the use of a hollow shaft and an axial rod therein without sacrificing simplicity and durability of construction. In Fig. 8, only the rightward end of a motor 270' is shown, this motor having a solid shaft 271' with a projecting end 272' for supporting a variable-diameter V-type pulley 273'. In this form of the invention the pulley 273' includes a fixed flange 274 which is secured upon the extremity of the shaft 271' and a movable flange 275 having a sleeve 276 extending leftwardly or inwardly therefrom into the confines of the end bell 277 of the motor 270'. The end bell 277 is provided with a threaded opening 278 into which a bearing case or bearing support 279 is screwed. This bearing case has an end wall 281 with an opening 282 therein through which the inner end 283 of the sleeve 276 extends. Between the end 283 and a shoulder 284, the sleeve has a diametrally reduced portion 285 adapted to slide through the inner race 286 of a bearing 287 which is secured within the bearing case 279 and is adapted to be moved axially in response to axial movement of the bearing case 279. A simple manner of securing the bearing 287 within the bearing case 279 is to seat the outer race 288 thereof against an internal shoulder 290 within the bearing case 279 by means of an end member 291 which may be secured to the rightward open end of the bearing case 279 by means such as screws 293.

The shaft 271' may rotate but is prevented from moving axially by the bearing means, not shown, situated at the leftward end thereof. The rightward end of the shaft 271' is rotatably supported by the bearing 287 which is mounted upon the diametrally reduced portion 285 of the sleeve 276. A key or spline 294 is provided between the rightward end of the shaft 271' and the sleeve 276 to prevent rotation of the sleeve and the flange 275, but to permit axial movement thereof. In the operation of the device the belt 295 operating in the V-groove 296 formed between the flanges 274 and 275 exerts a pressure to force the flange 275 leftwardly so as to hold the shoulder 284 of the sleeve 276 against the inner race 286 of the ball bearing 287. Accordingly, if the bearing case 279 is screwed further into the threaded opening 278 of the end bell 277, the lateral force exerted by the belt 295 will force the flange 275 leftwardly to an extent permitted by the position of the bearing 287 as controlled by the position of the member 279. When the member 279 is turned so as to screw rightwardly or out of the threaded opening 278 of the end bell 277, the bearing 287 will be moved rightwardly, thereby forcing the sleeve 276 and the flange 275 toward the fixed flange 274, reducing the width of the V-groove formed between the flanges 274 and 275 and causing the belt to operate on a larger diameter.

It will be appreciated that the screw members employed in the various forms of my invention for the purpose of moving the movable flange of an adjustable V-type pulley may be remotely operated. For example, in Fig. 8 the member 279 is shown with a flange 297 to which an actuating member may be secured. Such actuating member may be a hand wheel such as shown at 271 in Fig. 7 or may be a sprocket 298 over which a chain may be run for the purpose of turning the member 275 from a remote position.

Where space limitations are not of importance, my invention may be practiced in the form shown in Fig. 9, in which a bracket 300 is secured to the end member 301 of a motor 302, this bracket having a horizontal wall 303 which supports a vertical wall 304 at the end of the shaft 305 of the motor 302. In this form of the invention a sleeve 306 is mounted upon the projecting end 307 of the shaft 305, and on this sleeve 306 a fixed flange 308 is secured adjacent the end member 301 of the motor 302. A movable flange 310 is mounted on the leftward end of the sleeve 306 so as to be axially slidable, and such movable flange 310 is provided with an extending hub 311 having a keyed or splined engagement at 312 with the sleeve 306 so that it will be caused to rotate with the sleeve 306. The vertical wall 304 of the bracket 303 supports an internally threaded cylindrical wall 313 into which an adjusting member 314 for the pulley flange 310 is screwed. This adjusting member consists of an externally threaded sleeve 315 having an end wall 316 from which a bearing support or axial bar 317 extends rightwardly or inwardly relative to the sleeve 311 of the flange 310. The rightward end 318 of the bar 317 carries a thrust bearing 319 thereon, the outer race of which bearing fits into a bearing recess 321 formed in the leftward end of the sleeve 311. A grease chamber 322 may be formed adjacent the bearing 319 by fitting the end of the sleeve 311 with a cap 323 provided with an opening 324 through which the support 317 extends, said support 317 being provided with a passage 325 through which grease may be fed into the chamber 322 from an external grease fitting 326 mounted in the head 316 of the member 315. Rotation of the member 315 causes the same to screw in or out of the internally threaded tubular wall 313. The axial movement of the member 315 thus produced is transmitted through the bearing support 317 to the bearing 319, and the position of the bearing 319 is employed to determine or control the position of the flange 310 relative to the flange 308. The pressure of the belt employed between the flanges 308 and 310 holds the sleeve 311 against the outer race of the bearing 319, but other means such as a spring 327 may be employed for this purpose, which spring 327 is disposed between the end of the sleeve 306 and the end wall of the sleeve 311 in which the bearing 319 is formed. To indicate the position of the operating or adjusting member 315, suitable markings may be placed thereon, which markings may be referred to a stationary index mark on the tubular wall 313 of the bracket 303. For this purpose I show a cylindrical metal wall 328 extending rightwardly in a position to overlap the tubular wall 313 when the member 315 is screwed rightwardly into the threads formed on the interior of the wall 313.

My invention also comprehends a device in which a simplified and improved form of spring-actuated V-type variable-diameter pulley is employed, there being a simple means for maintaining the center lines of the pulleys in alignment during the different positions of adjustment of the variable-diameter pulley. In Fig. 11 I show a spring-type variable-diameter V-pulley 330 which is connected by means of a V-belt 331 with a V-pulley 332 of non-variable characteristics. In considering Fig. 11, it is to be understood that the pulley 332 is shown above the pulley 330 only for convenience in illustration, the actual position of use of the pulley 332 being in or near a horizontal plane extending through the pulley 330. The pulley 330 comprises a fixed flange 333 and an axially movable flange 334, the axially movable flange 334 being urged toward the flange 333 by yieldable or resilient means such as a spring, as will be hereinafter described. By separating the pulleys 330 and 332, the belt 331 may be pulled in between the flanges 333 and 334, forcing them apart against the action of the spring means which tends to hold them together in closer relationship. Likewise, moving of the pulleys 330 and 332 relatively toward each other will relieve the pull on the belt so that the radial force resultant of the pressure of the inclined inner conical faces of the flanges 333 and 334 will move the belt outwardly from the position in which it is shown in Fig. 11 to a position of operation on a larger diameter of the pulley 330. It is understood, however, that if only one of the flanges, such as the flange 334, is movable in axial direction, the center line of the pulley 330, or, in other words, the central plane disposed between the flanges 333 and 334, will move in axial direction a distance one-half the distance of movement of the flange 334, and accordingly a disalignment of the center lines of the pulleys 330 and 332 will result when the effective diameter of the pulley 330 is varied by the movement of the flange 334 relative to the flange 333, unless means are provided for bodily moving one or the other of the pulleys 330 and 332 in axial direction whereby to maintain the center lines of the pulleys always in practicable alignment. In the form of the invention shown in Fig. 11, one of the pulleys is mounted on a swingable structure, swinging movement of which structure is employed to change the distance between the pulleys 330 and 332 so as to accomplish a desired movement of the belt so as to vary the effective diameter of the variable-diameter pulley. The swinging movement of the supporting structure is employed to produce a relative axial movement of the pulleys 330 and 332 whereby to maintain such pulleys in operative alignment. In the preferred practice of the invention I prefer to embody the foregoing described swinging structure in the motor 335, and accordingly I provide extensions or bracket members 336, preferably on the bottom of the motor 335, for the purpose of engaging a horizontal shaft or bar 337 carried by a supporting plate 338. The motor 335 is then mounted so that it may swing or rotate upon the horizontal shaft, through a plane perpendicular to the axis of the motor and the axis of the shaft 337. For the purpose of swinging the motor 335, a bracket 339 is extended upwardly from the supporting plate 338, and screw means 341 are operative between the upper end of the bracket 339 and the motor to swing the motor 335 relative to the supporting plate 338. The screw means 341, as best shown in Fig. 13, comprises a threaded shaft or screw 342 having a ball 343 secured thereon, this ball being seated or held between upper and lower socket members 344 and 345 mounted at the upper end of the bracket 339. The threaded end 346 of the shaft 342 extends through a ball member 347 having a diametral threaded opening 348 therein. The ball 347 is held between cooperating socket members 350 and 351 secured to the top of the motor 335. As clearly shown in Fig. 11, the upper and lower socket members which engage the respective balls 343 and 347 are held tightly yet yieldably in engagement with such balls by means of springs 352 which are placed under pressure by screws 353.

A feature of the spring-actuated pulley shown in Fig. 11 is that it requires minimum space for the reason that the spring element 355 thereof is placed within an axial opening 356 formed within the projecting end 357 of the motor shaft 358. The pulley 330, with its cooperating parts, is preferably formed in a unit which may be bodily applied to the end 357 of the shaft 358. The pulley structure accordingly includes a cup member 360 adapted to fit over the end 357 of the shaft 358, and on which the flange 333 is fixed. A key means 361 is operative between the cup 360 and the shaft 358 to prevent rotation of the cup 360 relative to the shaft 358. The flange 334 has a sleeve portion or hub 362 which is slidable upon the leftward end of the cup 360. From an end wall or head 363 formed on the leftward end of the sleeve 362, an axial bar 365 extends rightwardly through an opening 366 in the end wall of the cup 360. The spring element 355 surrounds the portion 367 of the axial bar 365 extending rightwardly from the opening 366, and the spring element 355 is compressed between the end wall of the cup 360 and nuts 368 which are threaded on the rightward end of the bar 365 in locking corelation. The action of the spring element 355 is to move the bar 365 and the movable flange 334 in rightward direction, or, in other words, toward the fixed flange 333. The action of the spring element 355 is to yieldably urge the flange 334 toward the flange 333 at all times regardless of whether the pulley 330 is mounted on the shaft 358 or not. When the pulley 330 is applied to the shaft 358 by extending the cylindrical walls of the cup 360 thereover, the spring element 355, the portion 367 of the bar 365, and the nuts 368 rest within the axial opening 356 formed within the shaft 358.

The variation of the speed of the pulley 332 is accomplished in this form of the invention by swinging the motor 335 so as to move the pulley 330 relative to the belt 331. This swinging movement of the motor 335 is accomplished by rotating the threaded shaft 342 through use of an operating handle means 370. The relative axial movement of the pulleys 330 and 332 is accomplished by causing axial movement of the motor 335 as it swings on the shaft 337. To accomplish this axial movement of the motor 335, I provide a projection 371 on the brace plate 338, offset laterally from the shaft 337, and extend a projection 372 downwardly from the motor 335 in the vertical plane of the projection 371. Depressions or sockets 373 and 374 are formed in facing relation in the projections 371 and 372, and a swinging strut or bar 375 has the rounded ends thereof seated in the sockets 373 and 374, as shown in Fig. 11. A spring 376 is placed in a position around the rightward portion of the shaft 337 so as to bear leftwardly against the motor 335 and thereby hold the projection 372 in tight engagement with the rightward end of the strut 375, and also hold the leftward end of the strut 375 tightly in the socket 373 of the projection 371. In Fig. 11 the flange 334 is shown separated to maximum extent from the flange 333 owing to the fact that the belt 331 is pulled down into the bottom of the V-groove formed between the flanges 333 and 334. To increase the effective diameter of the pulley 330 it is necessary to swing the motor 335 toward the pulley 332. As this is done, the belt 331 moves outwardly between the flanges 333 and 334, and the spring element 355 moves the flange 334 toward the flange 333 so that the center line of the pulley 330 will move toward the flange 333. At the same time, the swinging movement of the motor 335 carries the rightward end of the strut 375 upwardly along an arc 377, with the result that there is at the same time a leftward travel of the rightward end of the strut 375 which permits the spring 376 to force the motor 335 leftwardly, thereby bodily moving the pulley structure 330 leftwardly to compensate for the change in the position of the center line of the pulley 330 as previously described. Accordingly, as the motor 335 is swung toward the pulley 332, the spring 376 in cooperation with the strut 375 produces a leftward axial movement of the pulley 330, and when the motor 335 is moved away from the pulley 332, the downward swinging movement of the rightward end of the strut 375 forces the motor 335 in rightward direction, with the result that the swinging movement of the motor 335 for the purpose of producing a variation in the effective diameter of the pulley 330 automatically accomplishes a relative axial movement of the pulleys 330 and 332 to keep them in operative alignment. I prefer to accomplish control of the variable-diameter pulley 330 by swinging the motor instead of by swinging the shaft 378 on which the pulley 332 is mounted, for the reason that generally the shaft 378 is directly connected to a machine to be driven and therefore could not be conveniently moved, whereas the motor 335 may be swung without any effect in the variable-speed transmission other than set forth hereinabove.

I am aware of the fact that the use of spring-actuated pulleys of the general character shown in Fig. 11 is not entirely satisfactory where the loads applied to the motor through the belt change suddenly for the reason that the sudden change in load or torque will pull the belt temporarily in between the flanges of the pulley so as to produce an undesired reduction in the speed at which the belt is driven. In Fig. 10 I show a mechanically or manually adjustable variable-diameter V-type pulley 380 which is to be substituted in the structure shown in Fig. 11 where sudden load changes are encountered in a driven device. In this pulley 380 a fixed flange 381 and an axially movable flange 382 are mounted on a cup member 383 which is adapted to be fitted upon the extending end 384 of the motor shaft 356. Key means are provided at 385 for preventing rotation of the axially movable flange 382 relative to the member 383, and the axially movable flange has a leftwardly extending cylindrical wall or sleeve 386 with a head or end wall 387 provided with an axial opening 388 through which a screw 390 extends, such screw 390 having a head 391 secured thereon by which it may be rotated relative to the sleeve 386. The end wall 392 of the cup 383 is provided with a threaded opening 393 in which the threads 394 of the screw 390 are threaded. A compression spring 395 disposed within the sleeve 386 between the end wall 392 of the cup 383 and the end wall 387 of the sleeve 386 exerts a yieldable force to move the flange 382 leftwardly or away from the flange 381.

The manually adjustable variable-diameter pulley 380, when secured upon the shaft 356 of the motor 335 of Fig. 11, may be adjusted to any desired effective diameter while the motor is swung toward the pulley 332. After the adjustment of the pulley 380, the motor is swung away from the pulley 332 to cause the belt 331 to become tight upon the pulley 380. In this form of the invention the motor must be stopped when a change in the effective diameter of the pulley 380 is required, whereas in the form of the invention shown in Fig. 4, the variable-diameter pulley may be adjusted while the motor is in operation.

Figure 14:
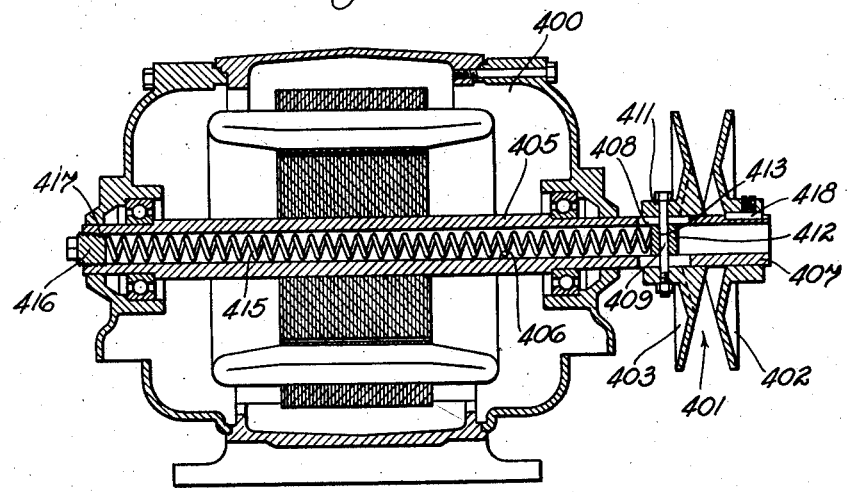
Fig. 14 is a longitudinally vertically sectioned view showing a form of my spring-operated variable-diameter pulley applied to a motor.

In Fig. 11 I have shown a form of my spring-actuated pulley in which the outer flange is axially movable and the inner flange is fixed. In Fig. 14 I show a motor 400 equipped with a variable-diameter V-type pulley 401 having a fixed outer flange 402 and an axially movable inner flange 403. In this form of the invention the motor 400 is provided with a tubular or hollow shaft 405 having an opening 406 extending from end to end thereof. In the projecting end 407 of the tubular shaft 405, near the rightward end of the motor 400, longitudinal, diametrically opposed slots 408 are placed through which a diametral pin 409 may be extended so as to engage a hub 411 formed on the axially movable flange 403. Within the axial opening 406 of the shaft 405 a sliding block 412 of cylindrical form is placed, this block having a diametral opening 413 through which the pin 409 passes.

Figure 15:
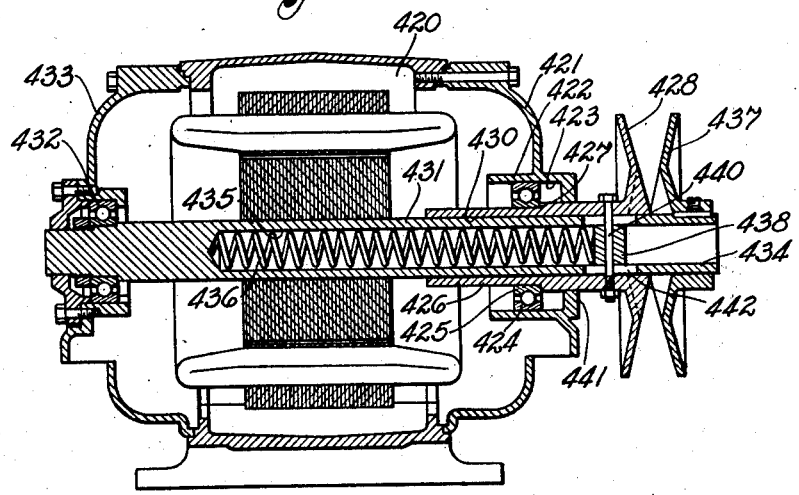
Fig. 15 is a longitudinally vertically sectioned view showing a form of my spring-operated variable-diameter pulley applied to a motor.

A helical spring 415 is placed in the axial opening 406 in a position between the sliding block 412 and a threaded plug 416 adapted to screw into threads 417 formed within the leftward end of the shaft 405. The force with which the spring 415 bears rightwardly against the block 412 may be varied by screwing the plug 416 in or out of the threads 417 formed in the leftward end of the opening 406. The force of the spring 415 yieldably urges the axially movable flange 403 toward the fixed flange 402 which may be firmly secured on the extreme rightward end of the shaft 405 by use of any desired means. For this purpose I have shown key means 418 for preventing rotation of the flange 402 relative to the shaft 405. Relative rotation of the flange 403 is prevented by reason of the engagement of the diametral pin or bolt 409 with the side walls of the diametral slot 408 formed in the wall of the shaft 405. The pulley 401, like the pulley 330 of Fig. 11, has its effective diameter varied by the action of the belt.

Where an exceptionally rugged pulley structure is desired, or where it may be required to dispose the pulley in closer relation to the ends of the motor, I vary the form of the invention shown in Fig. 14 in the manner shown in Fig. 15, in which a motor 420 is provided with an end bell or member 421 having a cylindrical wall 422 set axially therein, this wall 422 having a smooth bore 423 in which the outer race of a ball bearing 424 may slide axially. The inner race 425 of the bearing 424 is mounted on an axial sleeve 426 in a position to rest against a shoulder 427 formed on such sleeve 426. The sleeve 426 forms an extended hub or an axially movable flange 428, and the sleeve 426 has a bore 430 which slidably fits a motor shaft 431, the leftward end of which motor shaft is carried in a bearing 432 secured in the leftward end bell 433 of the motor 420. In the assembly of parts shown the sleeve 426 operates with or forms a slidable part upon the rightward portion of the shaft 431, and the support of the rightward end of the shaft 431 is accomplished through engagement of the sleeve 426 with the ball bearing 424. The rightward end 434 of the shaft 431 projects from the flange 428, and a fixed flange 437 is secured thereon. The rightward portion of the shaft 431 is counterbored to provide an axial opening 435 therein to accommodate a spring 436 having the function of forcing rightwardly against a slide block 438 through which a diametral bolt or pin 440 extends. Between the end wall 441 of the cylindrical wall 422 and the flange 428, the ends of the diametral pin 440 engage the sleeve 426, and longitudinal slots 442 are formed in diametrally opposed positions, through which slots 442 the pin 440 passes and in which slots the pin 440 is axially movable relative to the shaft 431. In this form of the invention the movement of the flange 428, due to the combined actions of the spring 436 and the belt which may be employed in the V-slot of the pulley, correspondingly moves the sleeve 426 so as to bodily move the bearing 424 in the bore 423 of the cylindrical wall 422. The shaft structure in this manner produced is very rigid, and by following this design the variable-diameter pulley may be placed close to the end of the motor so that space requirements for the pulley beyond the end of the motor will be maintained at a minimum.

As will be perceived from Figs. 16 and 17, my invention contemplates the use of a driving and driven V-type pulley situated in axial alignment, in addition to the use of such pulleys disposed in offset planes as disclosed in preceding views of the application. In these Figs. 16 and 17 I show a motor 450 having a hollow shaft 451 on which a variable-diameter V-type pulley 452 is mounted, such pulley 452 comprising a fixed flange 453 and an axially movable flange 454, both of these flanges 453 and 454 being mounted upon a sleeve 455 carried upon the rightwardly projecting end 456 of the shaft 451. The axially movable flange 454 has a rightwardly extending hub or sleeve 457 provided with an end wall 458 in which a bearing recess 460 is formed for the purpose of receiving a thrust bearing 461 which is connected to an axial shaft 462 which extends leftwardly through the axial opening of the hollow shaft 451. The leftward end 464 of the bar 462 is secured to a threaded member 465 adapted to be rotated by a handle 466. As the threaded member 465 screws in and out of an internally threaded stationary part 467 secured to the leftward end of the motor 450, the bar 462 will be correspondingly rotated and will be moved axially so as to transmit axial movement through the bearing 461 to the axially movable flange 454, whereby to change the spacing of the flanges 453 and 454 and consequently vary the effective diameter of the pulley 452.

A shaft 468 is supported by bearing means 469 in alignment with the motor shaft 451, and on the leftwardly extending end 471 of the shaft 468 a variable-diameter V-type pulley 472 is mounted, this variable-diameter pulley 472 comprising a sleeve member 473 adapted to be secured upon the end 471 of the shaft 468, a fixed flange 474, and an axially movable flange 475. The axially movable flange 475 has a hub or sleeve 476 which projects toward the sleeve 457 of the pulley 452, and in the leftward end of the sleeve 476 a thrust bearing 477 is mounted for connection to a means for controlling the axial movement of the flange 472. For this purpose the bar 462 is provided with an extending end 478 which projects through a protective shaft or housing 480 placed over the bearing 461 and is secured to the inner race of the ball bearing 477. Consequently, when the bar 462 is moved leftwardly from the position in which it is shown in Fig. 16, it will move the flange 454 toward the flange 453 of the pulley 452 and will move the flange 475 leftwardly away from the flange 474 of the pulley 472, thereby increasing the effective diameter of the pulley 452 and correspondingly decreasing the effective diameter of the pulley 472.

Driving connection between the pulleys 452 and 472 is accomplished through the use of a V-belt 482 which is carried over idler V-type pulleys 483 and 484 mounted to one side or below the axis of the motor shaft 451 and of the shaft 468. One of the pulleys, such as the pulley 483, is mounted by means of a ball bearing 485 upon a shaft 486 which is turnable in bearings 487. The other idler pulley 484 may be secured directly to the shaft 486 so as to drive this shaft through key means such as shown at 490; accordingly, a projecting end 491 of the shaft 486 may be employed for driving purposes, if desired. The bearings 487 are held in a head 492 formed in the outer end of a bracket arm 493 which is pivotally secured at 494 to a plate 495 so as to swing under the force of a spring 496 in a direction to carry the pulleys 483 and 484 away from the pulleys 452 and 472, thereby maintaining a desired tension in the belt at all times. In the form of the invention shown in Figs. 16 and 17 a long belt is employed, and consequently a resilient drive connection is obtained in a relatively small space for the reason that the long V-belt is looped over a pair of idler pulleys 483 and 484.

In Fig. 18 I show a variable-diameter V-type pulley 500 of such form that it may be mounted directly upon the end of a shaft, such as a motor shaft 501 which projects from a motor 502, without necessity of reconstruction of the supporting means or for drilling or counterboring of the shaft. The pulley 500 includes a sleeve member 503 adapted to be slid onto the end of the shaft 501 and secured thereto, key means 504 being employed in the customary manner. On the rightward or inner portion of the sleeve 503 a fixed flange 505 is formed, and in axially slidable relation a sleeve 506 is mounted upon the sleeve 503, key means 507 being employed to prevent relative rotation of the sleeves 503 and 506. On the rightward end of the sleeve 506 an axially movable flange 508 is formed which is adjusted axially with relation to the flange 505 in consequence of axial movement of the sleeve 506 relative to the sleeve 503. Within the leftward end of the sleeve 503 a combined radial-thrust bearing 510 is secured by means of a cap 511, and leftwardly from the bearing 510 a screw 512 is extended through the leftward portion of the sleeve 506. A nut member 513 of axially elongated form is threaded upon the screw 512 and projects into the leftward end of the sleeve 506 through a demountable plate 514 to engage the inner race 515 of a ball bearing 516 which is mounted within the leftward portion of the sleeve 506 and secured to the sleeve 506 by use of known means of ball bearing installation.

Since the sleeve 503 is secured to the shaft 501, it will not move axially, and accordingly the outer race of the ball bearing 510 is held from axial movement. By producing relative rotation between the screw 512 and the nut member 513, the nut member 513 may be caused to move relative to the screw and thereby move the bearings 510 and 516 relative to each other in axial direction. Since the bearing 510 cannot move axially, the relative movement consists in an axial movement of the bearing 516, which, being connected to the sleeve 506, moves the flange 508 relative to the flange 505. In the form of the invention shown in Fig. 18, the relative rotation between the screw 512 and the nut member 513 is accomplished by rotation of the screw 512 by means of a handle 517 mounted on the leftward end thereof, the nut member 513 being prevented from rotation but being permitted to move axially by extending a radial arm 518 from the nut member 513, this arm 518 having a fork 520 formed in the lower end thereof engaging a bar 521 which is substantially parallel to the axis of the screw 512 and may be held in desired position by securing it to the motor 502 at 522.

The pulley device shown in Fig. 18 is a unitary structure which takes its operative position and alignment from the shaft 501 on which it is mounted. Being thus automatically aligned, it does not require outboard, carefully aligned supporting means for the screw 512 or the nut member 513. The pulley 500 may be adjusted during rotation of the pulley, since the adjusting means consisting of the screw 512 and the nut member 513 does not rotate with the pulley 500.

In Fig. 19 I show the manner in which a pulley structure following the general principles of the device shown in Fig. 18 may be adjusted by rotation of the nut member instead of by rotation of the screw. In this form of the invention most of the respective parts have been given the same numbers as the parts illustrated in Fig. 18 for the reason that the pulley structure is in duplicate of the structure shown in Fig. 18 with the exception that the nut member 513 of Fig. 19 is adapted to be rotated by means of a hand wheel 525 formed thereupon, and the screw 512, instead of having means for rotation thereof, is prevented from rotation but is permitted to move axially by a radial arm 526 secured to the leftward end thereof and having a fork 527 adapted to slidably engage a stationary member 528 which may consist of a bar carried by a bracket 530 adapted to be secured to a supporting structure, such as the floor on which the motor 502 is mounted, in such position that the bar 528 will be held in a position parallel to the screw 512.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A variable-speed transmission of the character described, including: a belt; a motor; a shaft member; a pair of pulleys over which said belt runs, one of said pulleys being mounted on said motor and the other on said shaft member, one of said pulleys being of adjustable V-type having a fixed flange and an axially movable flange; adjusting means for positively and directly moving said movable flange relative to said fixed flange as desired so as to vary the effective diameter of said adjustable pulley; and means operative in consequence of said adjusting means to axially move said motor to keep said pulleys in operative alignment through all positions of adjustment of said adjustable pulley.

2. A variable-speed transmission of the character described, including: a belt; a motor; a shaft member; a pair of pulleys over which said belt runs, one of said pulleys being mounted on said motor and the other on said shaft member, one of said pulleys being of adjustable V-type having a fixed flange and an axially movable flange; adjusting means for positively and directly moving said movable flange relative to said fixed flange as desired so as to vary the effective diameter of said adjustable pulley, said adjusting means having a rotatable shaft; and a screw member connected to said rotatable shaft and operative to rotate said rotatable shaft and simultaneously to axially move said motor to keep said pulleys in operative alignment through all positions of adjustment of said adjustable pulley.

3. A variable-speed transmission of the character described, including: a belt; a motor; a shaft member; a pair of pulleys over which said belt runs, one of said pulleys being mounted on said motor and the other on said shaft member, one of said pulleys being of adjustable V-type having a fixed flange and an axially movable flange; a bar extending parallel to the axis of said motor and swingably supporting said motor; a support for said bar having threaded engagement with said bar so that said bar will move axially when rotated; adjusting means for moving said movable flange relative to said fixed flange so as to vary the effective diameter of said adjustable pulley; actuating means for operating said adjusting means and simultaneously rotating said bar, said bar moving relative to said support and causing movement of said motor in axial direction to keep said pulleys in operative alignment through all positions of adjustment of said adjustable pulley; and yieldable means for swinging said motor on said bar in a direction away from said shaft member whereby to keep said belt tight.

4. In a variable speed transmission, the combination of: a motor including a drive shaft; a variable-diameter V-type pulley on said drive shaft adapted to receive a belt; pivotal supporting means adapted to support said motor so that it may be rotated about an axis parallel to said drive shaft; means for positively adjusting the diameter of said pulley; means adapted to rotate said motor about said axis; and means for axially moving said drive shaft as the diameter of said pulley is adjusted.

5. In a variable speed transmission, the combination of: a motor including a drive shaft; a variable-diameter V-type pulley on said drive shaft adapted to receive a belt; a rotatable bar adapted to swingably support said motor, said bar being axially movable to move said drive shaft axially; means for varying the diameter of said pulley, said means being associated with said bar; control means for moving said bar axially and simultaneously rotating it to move said drive shaft axially and simultaneously vary the diameter of said pulley; and means for rotating said motor about said bar as said control means is actuated to maintain a substantially uniform tension in said belt.

6. In an adjustable speed drive, a driving pulley structure, a driven pulley structure, a belt in active power transmitting relation to said pulley structures, said driving pulley structures having a pair of pulley sections with opposed inclined faces, forming by relative axial adjustment variable effective pulley diameters, an electric motor having a tubular shaft and a rotor, means for rotatably supporting said shaft, means for securing one of said pulley sections to said shaft, and means for adjusting the axial position of the other of said pulley sections, said adjusting means including an axially adjustable rod extending into said tubular shaft and axially fixed with respect to the adjusted pulley section, and means for adjusting the axial position of said rod from the side of the motor remote from the pulley section.

7. In an adjustable speed drive having a belt in active power transmitting relation to a pair of pulley structures, one of said pulley structures having a positively adjustable effective diameter and including an axially fixed pulley section and an axially adjustable pulley section, said pulley sections having opposed inclined faces, and the center distance between the axes of said pulley structures being variable, the combination therewith of means for adjustably mounting one of said pulley structures for movement in a direction to adjust the center distance between the two pulley structures, as well as in a direction to keep the belt in substantial alignment, and means for adjusting the center distance between the axes of said pulley structures in response to the adjustment of said adjustable diameter pulley structure.

8. A variable-speed transmission of the character described, including: a belt; a power device mounted so as to move in a direction perpendicular to its axis; a shaft having its axis parallel to the axis of said power device; a pair of adjustable V-type pulleys, one of which is mounted on said power device and the other of which is mounted on said shaft, said pulleys carrying said belt; a screw device adjacent each of said pulleys for adjusting the same so as to increase the diameter of one of said pulleys as the diameter of the other of said pulleys is decreased, each of said screw devices having an operating sprocket thereon; a sprocket member disposed to one side of the plane defined by the axes of said operating sprockets of said screw devices; chain means connecting said operating sprockets with said sprocket member; means for rotating one of said sprockets whereby to cause operation of said screw devices; and yieldable means exerting a force to move said power device away from said shaft.

9. A variable-speed transmission of the character described, including: a belt; a power device; a bar swingably supporting said power device, said bar being substantially parallel to the axis of said power device; a shaft having its axis parallel to the axis of said power device; a pair of adjustable V-type pulleys, one of which is mounted on said power device and the other of which is mounted on said shaft, said pulleys carrying said belt; a screw device adjacent each of said pulleys for adjusting the same so as to increase the diameter of one of said pulleys as the diameter of the other of said pulleys is decreased, each of said screw devices having an operating sprocket thereon; a sprocket member mounted on said bar in alignment with said operating sprockets of said screw devices; chain means connecting said operating sprockets with said sprocket member; means for rotating said bar whereby to cause rotation of said screw devices; and yieldable means exerting a force to move said power device away from said shaft so as to maintain said belt tight on said pulley at all times.

10. A variable-speed transmission of the character described, including: a hollow housing; pivot means within said housing; a motor swingably supported within said housing on said pivot means; bearing means in said housing for a shaft; a shaft carried by said bearing means substantially parallel to the axis of said motor and with the end thereof in outboard relation to said bearing means; a belt; a pair of cooperating variable-speed pulley members, one of said pulley members being mounted on said outboard end of said shaft, and the other of said pulley members being mounted on said motor in operative alignment with the first of said pulley members; means for adjusting said variable-speed pulley members from the exterior of said housing; means for swinging said motor on said pivot means; and means providing access to said pulley members from the exterior of said housing.

11. A variable-speed transmission of the character described, including: a hollow housing; a bar within said housing having one end thereof projecting from said housing; a motor swingably supported within said housing on said bar; bearing means in said housing for a shaft; a shaft carried by said bearing means substantially parallel to the axis of said motor and with the end thereof in outboard relation to said bearing means; a belt; a pair of cooperating variable-speed pulley members, one of said pulley members being mounted on said outboard end of said shaft, and the other of said pulley members being mounted on said motor in operative alignment with the first of said pulley members; means operative in consequence of rotation of said bar to adjust said variable-speed pulley members from the exterior of said housing; means applied to the projecting end of said bar for rotating the same; means for swinging said motor on said bar; and means providing access to said pulley members from the exterior of said housing.

12. In a variable-speed transmission device, the combination of: a belt; a motor having a drive shaft; a driven shaft; a pair of pulleys over which said belt runs, one of said pulleys being mounted on said drive shaft and the other on said driven shaft, one of said pulleys being of the variable-diameter V-type having a pair of flanges one of which is axially movable relative to the other; adjustment means for positively and directly moving said movable flange relative to said other flange as desired so as to vary the effective diameter of said adjustable pulley; and means operative in consequence of said adjusting means to move one of said shafts axially to keep said pulleys in operative alignment through all positions of adjustment of said adjustable pulley.

13. In a variable-speed transmission device, the combination of: a pair of pulley structures, one of said pulley structures being of the variable-diameter V-type having a pair of flanges one of which is axially movable relative to the other, one of said pulley structures being axially movable; belt means operatively connecting said pulley structures; means for mounting one of said pulley structures for movement in a direction to adjust the center distance between said pulley structures; means for moving said movable flange axially relative to said other flange to vary the effective diameter of said variable-diameter pulley; and means for adjusting the center distance between said pulley structures in response to the adjustment of the effective diameter of said variable-diameter pulley structure to maintain tension in said belt means, said axially movable pulley structure moving axially in response to said adjustment of the effective diameter of said variable-diameter pulley to maintain said pulley structures in alignment.

14. In a variable-speed transmission device, the combination of: a shaft member; a variable-diameter pulley structure of the V-type on said shaft member and adapted to receive a belt; pivotal supporting means adapted to support said pulley structure so that it may be rotated about an axis parallel to said shaft member; means for positively adjusting the effective diameter of said pulley structure; means adapted to rotate said pulley structure about said axis; and means for axially moving said shaft member as the effective diameter of said pulley structure is adjusted.

15. In a variable-speed transmission device, the combination of: a pair of pulley structures, one of said pulley structures being of the variable-diameter V-type having a pair of flanges one of which is axially movable relative to the other, one of said pulley structures being axially movable; belt means operatively connecting said pulley structures; pivotal supporting means adapted to support one of said pulley structures so that it may be rotated about an axis to change its center distance from said other pulley structure; means for moving said movable flange axially relative to said other flange to vary the effective diameter of said variable-diameter pulley; means adapted to rotate said rotatable pulley structure about said axis; and means for axially moving one of said pulley structures as the effective diameter of said variable-diameter pulley structure is adjusted, so as to maintain alignment of said pulley structures.

16. In a variable-speed transmission device, the combination of: a motor having a tubular drive shaft; a variable-diameter pulley of the V-type on said drive shaft, having a pair of flanges one of which is axially movable relative to the other to vary the effective diameter of said pulley; an axially adjustable rod extending into said tubular shaft, operatively connected to and axially fixed with respect to said movable flange; and adjustment means at the other side of said motor and operatively connected to said adjustable rod for axially moving said adjustable rod and said movable flange connected thereto to vary the effective diameter of said pulley.

17. In a variable-speed transmission device, the combination of: a motor having a hollow drive shaft; a variable-diameter pulley of the V-type on said drive shaft at one side of said motor, having a pair of flanges one of which is axially movable relative to the other to vary the effective diameter of said pulley; a control rod extending through said drive shaft and connected at one end to said movable flange; and adjustment means at the other side of said motor and operatively connected to said control rod for axially moving said control rod and said movable flange connected thereto to vary the effective diameter of said pulley.

18. In a variable-speed transmission device, the combination of: a drive shaft; a driven shaft, one of said shafts being tubular; a variable-diameter pulley of the V-type on said hollow shaft at one end thereof, having a pair of flanges one of which is axially movable relative to the other to vary the effective diameter of said pulley; a pulley on said other shaft; belt means operatively connecting said pulleys; an axially adjustable rod extending through said tubular shaft and operatively connected to said movable flange; adjustment means at the other end of said tubular shaft remote from said variable-diameter pulley and operatively connected to said adjustable rod for axially moving said adjustable rod and the movable flange connected thereto to vary the effective diameter of said variable-diameter pulley; and means for maintaining said belt means under tension in all positions of adjustment of said adjustment means.

19. In a variable-speed transmission device, the combination of: a pair of shafts; a pulley structure mounted on each of said shafts, each of said pulley structures being of the variable-diameter V-type having a pair of flanges one of which is axially movable relative to the other to vary the effective diameter of said pulley structures, one of said pulley structures being pivotally mounted on its shaft for rotation about said shaft; belt means operatively connecting said pulley structures; adjustment means connected to both of said movable flanges constructed and arranged so that actuation of said adjustment means simultaneously moves said movable flanges axially in opposite directions to increase the effective diameter of one of said pulley structures and simultaneously reduce the effective diameter of the other of said pulley structures; and means for resiliently urging said pivotally mounted pulley structure in a direction away from said other pulley structure to maintain tension in said belt means.

CARL E. JOHNSON.